Patented May 4, 1954

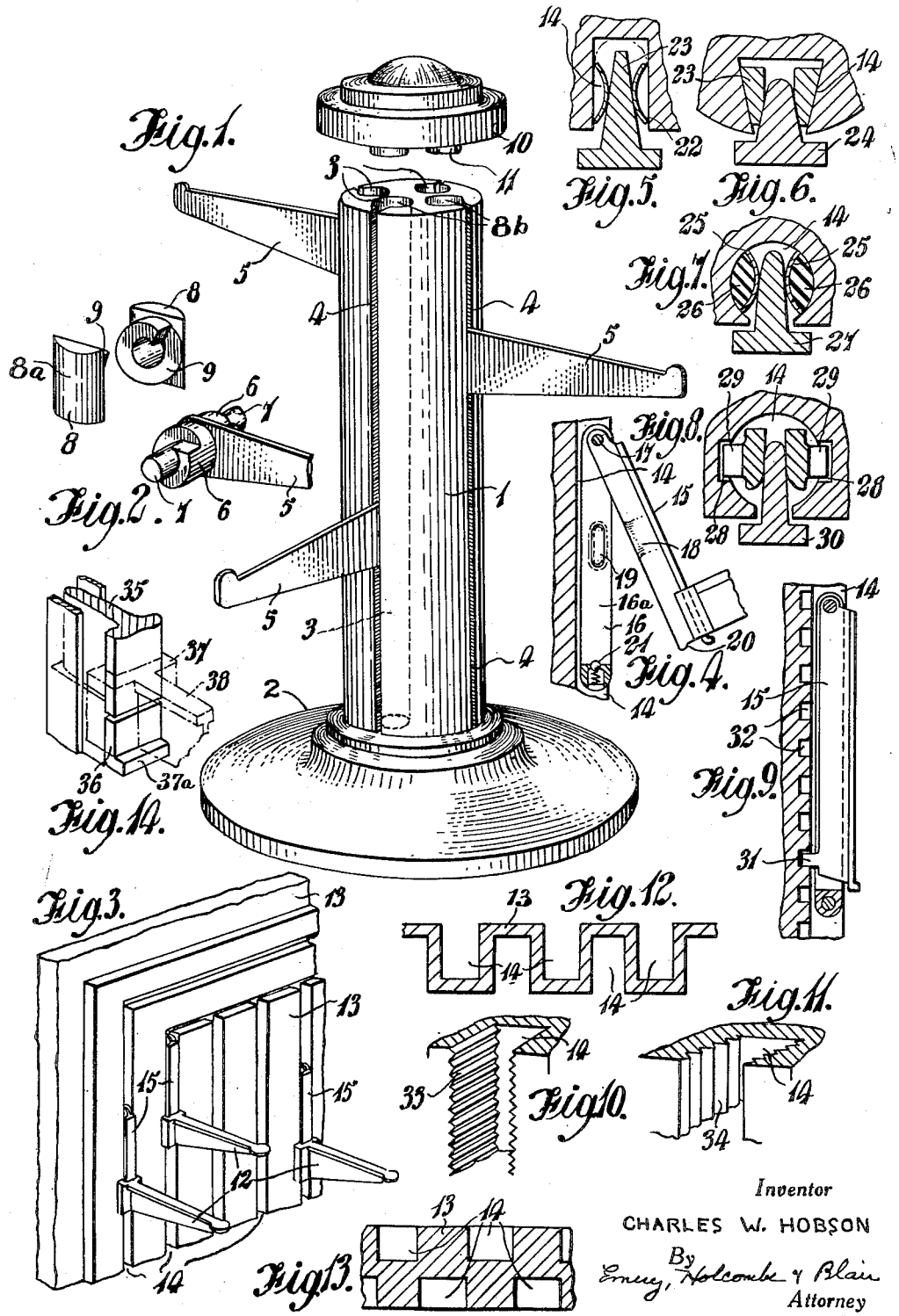

2,677,519

UNITED STATES PATENT OFFICE 2,677,519

ADJUSTABLE BRACKET SUPPORT

Charles William Hobson, Amersham, England

Application July 23, 1951, Serial No. 238,057

6 Claims. (Cl. 248—125)

The present invention relates to adjustable bracket supports and particularly to adjustable display stands which are suitable for use in shop windows or upon counters for displaying merchandise.

Such stands generally comprise a supporting pillar or surface with projecting brackets upon which the merchandise is supported, the positions of the brackets being adjustable to attain the desired display effect. In such display stands as hitherto constructed, the brackets are locked in the adjusted position by exposed locking means, such as screws, which are not only objectionable from the point of view of appearance but are also liable to damage some articles, such as delicate fabrics or silk stockings, if they should accidentally be caught on the screws. The employment of such external means for securing the brackets to the supporting surface is also often wasteful in the metal or other material used, particularly where the articles to be displayed are light in weight, for example, gloves, handkerchiefs, ties and the like. Further, with brackets secured by external means, it is not possible to secure two or more brackets at the same height such, for example, as when it is desired to use such brackets to support a display shelf or tray. Still further, many decorative effects applied to the supporting surface would be impracticable where external securing means are used owing to the risk of scratching or other damage.

Accordingly, it is an object of the present invention to provide a display stand having adjustable display brackets whose position-locking means are embodied within the support for the bracket.

It is another object of the invention to provide a display stand in the form of a pillar on a suitable base so constructed and arranged that a plurality of radial brackets can be accommodated thereon, each at the same height and all of them adjustable in height with hidden locking means so that a suitably shaped shelf may be supported on them if desired.

Another object of the invention is to provide improved locking means for adjustable display stands incorporating a wedge action so that the brackets may be gripped exceedingly firmly and not subject to slip.

In accordance with one feature of the invention, an adjustable bracket support comprises a channelled supporting member carrying one or more brackets projecting outwardly from the supporting member, the or each bracket being provided at its inner end with an elongated bearer which is slidable longitudinally in a channel in the supporting member for supporting the bracket in any position of adjustment along the channel, said bearer comprising two elongated members (hereinafter called "wedge members") between which a wedging member to which the bracket is attached is pivoted so as to be movable in and out from between said two wedge members which are adapted to be urged apart and wedged against the opposite side walls of the channel by the wedging member so as to lock the bearer and bracket to the supporting member when the wedging member is moved inwardly and the bracket is brought into a normal position of use, but which are adapted to be released from such wedging engagement with the channel walls when the wedging member is withdrawn outwardly by tilting the bracket from its aforementioned normal position, so as to allow the bearer to be slid along the channel to permit adjustment of the bracket to any desired position along the channel.

The supporting member may be in the form of a flat surface, such as a wall or a strip applied to a wall, or may be in the form of a pillar or a collar of any suitable cross-section and mounted upon a suitable base.

The wedging member may be elongated and pivoted at its upper end on a pin or the like which also secures together the upper ends of the two wedge members. The lower ends of the latter may be pinned or otherwise secured together, or they may be unconnected, and at an intermediate point or points they may be provided with opposed protuberances on their opposed faces, or with opposed portions of those faces which are closer together than the remainder, which protuberances or portions are adapted to be engaged and urged apart by a wedge-shaped portion of the wedging member. The latter may be in the form of a strip or blade of tapering cross section substantially throughout, or having a tapering cross-section at only a portion thereof corresponding to the position of the protuberances.

The elongated form of the bearer provides an extended bearing of adequate load-carrying capacity for the supported bracket and effectively transmits and distributes to the supporting member an imposed load or strain on the bracket, enabling substantial load-carrying capacity to be achieved with a slender form of bearer and a narrow form of channel. Also, a load on the bracket acts to increase the wedging and locking action of the bearer in the channel.

The bracket may be permanently attached to or formed integrally with the wedging member. Alternatively, the bracket may be detachable from the wedging member and thus allow interchangeable brackets, e. g., of different patterns, to be fitted to the same wedging member and bearer. For example, the wedging member may be of T-section to receive slidably a correspondingly T-slotted head on the inner end of the bracket.

In order that the invention may be more clearly understood, reference will now be made to the accompanying drawings which show various specific embodiments thereof by way of non-limiting example, and in which Fig. 1 shows a first embodiment comprising a pillar having radially disposed brackets.

Fig. 2 shows a detail of Fig. 1.

Fig. 3 shows another form of the invention by means of which display brackets may be fixed to a flat surface.

Fig. 4 shows a detail of Fig. 3.

Figs. 5 to 8 show various cross-sections of wedging member and wedge members.

Fig. 9 shows a form of locking device.

Figs. 10 and 11 show forms of corrugated walls for the supporting member.

Fig. 12 shows how the supporting member may be constructed from sheet material.

Fig. 13 shows how the invention may be applied to support brackets on opposite sides of a flat supporting surface, and Fig. 14 comprises a detail of a modification partly in section.

Referring to the drawings, Fig. 1 shows one form of the invention in which the supporting member is in the form of a pillar or column 1 mounted on a suitable base 2. Within the pillar 1 there are provided a plurality of channels 3, each having a slot 4 that communicates with the exterior of the pillar. Located within the channels 3 are wedge-locking bearers 6 to 9 for display brackets 5 which project from the slots 4 and may be slid up the channels 3 to be located at any desired height.

In order to grip and lock the display brackets 5 at a desired position, there is provided a locking means which operates on a wedge action, as shown more particularly in detail in Fig. 2. As illustrated, the brackets 5 are in the form of flat members and each one has rigidly connected thereto, at its inner end, a pair of cam members 6 arranged on opposite sides of said bracket inner end, the latter also carrying a pin 7 by which it is journalled in a pair of blocks 8 formed with complementary cam face portions 9, with which the cam members 6 are adapted to cooperate. The outer surfaces 8a of the blocks 8 are contoured to fit within the passages or channels 3 in the supporting pillar 1 and, in the arrangement shown, these outer surfaces of the blocks are of part-cylindrical shape so as to engage within a cylindrical passage 8b, as shown in Fig. 1, although it should be understood that they may be of any desired contour and not necessarily conform to that of the passage.

When the bracket is in the horizontal display position, the pairs of face cams are relatively disposed so as to force the blocks 8 into frictional clamping engagement with the surface of the passage 3. To release the bracket prior to adjusting it along the pillar, the bracket 5 is swung upwardly about the pin 7, whereupon the bracket may be moved to the desired position, afterwards being returned to its normal horizontal position to be locked in place.

In order to cover up the passages 3, the pillar is provided with a cap member 10 having projecting pegs or studs 11, each adapted to engage within one of the channels 3.

In a modification of the arrangement shown in Figs. 1 and 2, instead of employing the cam members 6 and 9, the inner faces of the blocks may be outwardly inclined to cooperate with a depending portion of the bracket 5, said depending portion being constructed or shaped to produce a wedging action on the blocks to force them apart and in which engagement is made with the walls of the passage 3 when the bracket is in the display position.

Figures 3 and 4 show an embodiment of the present invention in which the brackets are adjustably mounted upon a flat supporting surface. The brackets are shown at 12 and the flat supporting surface at 13. As shown, the supporting surface 13 is channelled at 14 to receive the display brackets 12. The inner end of each bracket 12 is provided with a T-slot by which it is attached, preferably detachably, by sliding it over the flanges of a pivoted arm 15 of T section, the said arm 15 forming the wedging member of a bracket bearer 16 which may be slid longitudinally in a channel 14. Each bearer member comprises two laterally spaced wedge members 16a between which the wedging member 15 on the bracket is pivoted at 17 so as to be movable in and out from between the two wedge members 16a which are adapted to be urged apart and wedged against the opposite sides of the channel 14 by the wedging member 15 so as to lock the bearer and bracket to the supporting member 13 when the wedging member 15 is moved inwardly and the bracket is brought into a normal position of use. It will be appreciated that Fig. 4 is an axial section taken through the channel 14 to show only one of the wedge members 16a. The pin 17 also serves to secure the upper ends of the wedge members 16a together. The wedge members 16a are adapted to be released from such engagement with the channel walls when the wedging member 15 is withdrawn outwardly by tilting the bracket 12 from its aforesaid normal position so as to allow the bearer 16 to be slid along the channel 14 to permit of the adjustment of the bracket along any desired position of the channel.

For effecting the wedging action, the wedging member 15 is provided with inwardly tapering side surfaces at 18 to engage with protuberances 19 on the opposed faces of the wedge members 16a whereby the protuberances and the wedge members will be urged apart as the tapered portion 18 is moved therebetween.

In order to locate or lock the wedging member in the wedging position a projection 20 is formed on the end of the wedging member remote from its pivot end 17, which projection engages a yieldably spring-loaded catch 21 provided in the adjacent part of the wedge member assembly 16 when the wedging member 15 is in wedging position.

The wedge members may be in the form of rods or strips and may be of cylindrical, triangular, square, rectangular or any other desired shape. Their outer surfaces may be contoured to fit that of the channel in the support. For instance, the wedge members may be of part-cylindrical shape to fit within a cylindrical channel, and their inner opposed surfaces may be substantially parallel. However, the outer surfaces of the wedge members may be of any desired contour, not necessarily conforming to that of the channel. The wedge members may have a degree of flexibility tending to withdraw them from engagement with the walls of the channel when the wedging member is withdrawn. The outer surfaces of the wedge members may be made rough or irregular by grooving, milling, knurling, stamping or otherwise, in order to increase their grip on the walls of the channel, or alternatively for this purpose, they may be faced and bonded with rubber or other similarly acting material, such as a suitable plastic, which may be of any desired cross-section or shape and the outer surface of which may be made rough or irregular as above mentioned or may be formed or moulded to provide one or more cavities which increase the grip by suction against the channel walls. The bearer components and the bracket may be made of metal, plastic or any other suitable material or materials.

The cross-section of the channel or channels in the supporting member may be of any desired shape and dimensions. The bearer may be shaped in cross-section accordingly to provide external surfaces fitting the walls of the channel, but as already mentioned, this is not essential so long as the required wedging action is obtained. The channel cross-section may be such as to permit insertion and withdrawal of the bearer laterally through the opening or mouth of the channel at the face of the supporting member. Thus, when the bearer is released by tilting the bracket, the latter, together with the bearer, may be completely removed from the supporting member by pulling them away from the face of the supporting member. Alternatively, the channel cross-section may be such as to retain the bearer therein and prevent lateral insertion and removal so that in this case the bearer is inserted and removed longitudinally through the end of the channel 14 at an end of the supporting member.

Certain examples of these arrangements are shown in Figures 5 to 8. In Fig. 5 the channel cross-section is in the form of a narrow U-shape with a flat bottom, as shown in full lines, or a rounded bottom as shown in dotted lines, with substantially parallel side walls to form the channel 14. In this embodiment, the wedge members are in the form of strips of springy metal 22 which grip a wedge-shaped wedging member 23.

Fig. 6 shows another form of channel cross-section of dove-tail shape providing a restricted opening or mouth to the channel at the face of the supporting member which is shown in the form of a pillar, similar to that of Fig. 1. In this case, the wedge members are cuneiform as shown at 23 and the wedging member 24 is suitably shaped to cooperate with them.

Fig. 7 shows a modification in which the channel 14 is substantially circular and in which the wedge members 25 are in the form of springy strips having rubber portions 26 contacting the surface of the channel 14. The wedging member 27 is shaped similarly to that shown in Fig. 5.

In another form the channel cross-sectional shape may provide one or more recesses or constrictions keying with the bearer and an example of this is shown in Fig. 8 in which the channel 14 has opposed recesses 28 in its side walls which key respectively with suitably shaped wedge members 29. The wedging member 30 is again of substantially similar shape to that shown in Fig. 5.

The supporting member may be made from any desired material, e. g., metal, plastic, papier mache, cardboard or any other suitable non-metallic material. If it is in the form of a pillar, as shown in Fig. 1, it may be extruded, pressed or moulded and, although Fig. 3 shows the supporting surface to be a flat wall surface, it should be understood that it may be in the form of a strip for application to a wall surface, for example, for mounting on a wall or partition in a shop window or elsewhere or in the internal corners of a show case, or again, the supporting member could be in the form of a panel suitable for use as a wall panel or as a show card. The panel or strip may be flat or of any desired curved configuration.

In another example, the supporting member may be made from aluminum or any other suitable material which can be rolled, stamped, extruded, moulded or otherwise formed into a suitably corrugated or other configuration forming the channel or channels, such as is shown in Fig. 12. Papier mache, cardboard and other similar materials may be used for small sizes of supporting members suitable, for example, for show cards.

The channelling in the surface of the supporting member presents a certain decorative effect which may be enhanced or supplemented in any desired way. For example, the portions of the surface of the supporting member between channels therein may be provided with any desired decorative design or pattern. Such portions may be flat or alternatively they may be convex, concave or of any other desired contour. Such contouring and the application of decorative designs or patterns as above mentioned may be carried out in producing the supporting member by rolling or by high pressure moulding methods. Such portions may also be of one colour while the channel or channels may be of another colour or colours so that a coloured striped effect is produced. A supporting member made of aluminum lends itself particularly well to such two-colour or multi-colour treatment by the anodising process.

The channel or channels 14 may be of any desired width, either relatively wide, e. g., $\frac{1}{2}''$ wide, or narrow, e. g., $\frac{1}{16}''$ or $\frac{1}{32}''$ wide. Preferably, the supporting member is provided with a plurality of channels, preferably parallel, as this provides for a greater variety of possible dispositions of a bracket or brackets thereon as well as lending itself to the production of a greater variety of decorative effects. The channels may be spaced apart at any desired intervals, regular or irregular, and such spacing may be very close, e. g., in the case of narrow channels, such as may be obtained with a supporting member consisting of corrugated cardboard, or the spacing may be wide, e. g., several inches, such as in the case of relatively large sizes of the supporting member, e. g., as wall panels.

The walls of the channel or channels in the supporting member may be notched, toothed or knurled or similarly treated to provide an enhanced grip for the bearer when wedged in the channel. Alternatively, the walls of the channel may be notched or toothed or recessed to receive a complementary projection on the bearer so as to provide a lock for the bearer in the channel in addition to the wedging lock. An example of this modification is shown in Fig. 9, the wedging member 15, similar in other respects to that shown in Fig. 4, is provided with a single projection or tooth 31 which is engageable within any one of a suitable number of recesses 32 contained in the rear portion of the channel 14.

Figs. 10 and 11 show how the walls of the channel 14 may be corrugated at 33 and 34 respectively to grip the two wedge members of the bearer which may, if desired, be similarly shaped on their wedging faces or may be faced and bonded with rubber or other similarly acting material, such as a suitable plastic, which may again have its surface notched or otherwise shaped to suit. In the arrangement of Fig. 10 the bearer may easily be removed laterally but in Fig. 11 it may only be removed vertically, owing to the direction of the corrugations.

Figures 12 and 13 show how the invention may be adapted to provide a display device comprising a supporting surface having projecting arms or brackets projecting from either side. These figures show the supporting surface 13 provided with channels 14 in oppositely staggered relationship, as shown.

Fig. 14 shows a modification of the invention in which the wedge member assembly has a portion 36 of T-section which is arranged to form a continuation of the T-section of the wedging member 35 when the latter is in the wedging position whereby the T-slotted head 37 of the detachable bracket 38 may be slid along the wedging member 35 so as to extend also over the said portion 35 of the wedge member assembly. An extension 37a of the wedge member portion 36 projects outwardly to aid in the supporting of the bracket 38.

It should be understood that the invention has been described in its specific embodiment purely by way of example and various modifications could be made to the specific details given without in any way departing from the scope of the invention as defined in the appended claims.

What I claim is:

1. An adjustable bracket support comprising a channelled supporting member, at least one bracket projecting outwardly from said supporting member, a channel in said supporting member, an elongated bearer at the inner end of each bracket slidable longitudinally in said channel for supporting the bracket in any position of adjustment along said channel, said bearer comprising two elongated wedge members, a wedging member removably attached to said bracket, said wedging member being of T-section and the inner end of said bracket having a correspondingly T-slotted head for slidable engagement with said wedging member, and a pivotal connection between said wedge members and said wedging member so that the bracket may be movable in and out from between said two wedge members which are adapted to be urged apart and wedged against the opposite side walls of said channel by said wedging members so as to lock said bearer and bracket to said supporting member when the wedging member is moved inwardly and the bracket is brought into a normal position of use, but which are adapted to be released from such wedging engagement with said channel walls when the wedging member is withdrawn outwardly by tilting the bracket from its aforesaid normal position so as to allow the bearer to be slid along said channel to permit adjustment of said bracket to any desired position along said channel.

2. An adjustable bracket support comprising a channeled supporting member, at least one bracket projecting outwardly from said supporting member, a channel in said supporting member, an elongated bearer at the inner end of each bracket slidable longitudinally in said channel for supporting the bracket in any position of adjustment along said channel, said bearer comprising two elongated wedge members, a wedging member attached to said bracket, a pivotal connection between said wedge members and said wedging member so that the bracket may be movable in and out from between said two wedge members which are adapted to be urged apart and wedged against the opposite side walls of said channel by said wedging member so as to lock said bearer and bracket to said supporting member when the wedging member is moved inwardly and the bracket is brought into a normal position of use, but which are adapted to be released from such wedging engagement with said channel walls when the wedging member is withdrawn outwardly by tilting the bracket from its aforesaid normal position so as to allow the bearer to be slid along said channel to permit adjustment of said bracket to any desired position along said channel, a projection at the end of said wedging member remote from its pivoted end, and a spring-loaded catch pin in the wedge member assembly, said projection engaging said catch pin when the wedging member is in wedging position.

3. An adjustable bracket support comprising a channelled supporting member, at least one bracket projecting outwardly from said supporting member, a channel in said supporting member, an elongated bearer at the inner end of each bracket slidable longitudinally in said channel for supporting the bracket in any position of adjustment along said channel, said bearer comprising two elongated wedge members, a wedging member removably attached to said bracket, said wedging member being of T-section and the inner end of said bracket having a correspondingly T-slotted head for slidable engagement with said wedging member, and a pivotal connection between said wedge members and said wedging member so that the bracket may be movable in and out from between said two wedge members which are adapted to be urged apart and wedged against the opposite side walls of said channel by said wedging member so as to lock said bearer and bracket to said supporting member when the wedging member is moved inwardly and the bracket is brought into a normal position of use, but which are adapted to be released from such wedging engagement with said channel walls when the wedging member is withdrawn outwardly by tilting the bracket from its aforesaid normal position so as to allow the bearer to be slid along said channel to permit adjustment of said bracket to any desired position along said channel, a portion of T-section on said wedge member assembly forming a continuation of the T-section of the wedging member when the latter is in wedging position, whereby the T-slotted head of said detachable bracket may be slid along said wedging member so as to extend also over the said T-section portion of the wedge member assembly for locking said wedging member in the wedging position.

4. An adjustable bracket support comprising a channelled supporting member for carrying at least one bracket projecting outwardly from the supporting member, a bearer at the inner end of said bracket and substantially wholly within a channel in the supporting member, said bearer comprising two laterally-spaced elongated wedge members and being longitudinally adjustable in said channel for supporting said bracket in any position of adjustment along said channel, an arm pivoted by one of its ends to one end of said bearer and between the said two elongated wedge members, so that said pivoted arm is swingable bodily about said pivot in and out from between said two wedge members, at least part of the length of said arm being shaped to taper towards the inner edge thereof, the said taper portion engaging between the wedge members to urge them apart under the action of the taper when the said arm is moved inwardly between the wedge members, the said arm thereby acting as a wedging member to wedge the wedge members against the opposite side walls of said channel and lock the bearer to the supporting member when the arm is moved to the position in which the bracket carried thereby will be in its normal position of use.

5. An adjustable bracket support as claimed in claim 4 in which the outer surfaces of said wedge members are provided with grip-promoting material to contact the walls of said channel when urged apart by said wedging member.

6. An adjustable bracket support as claimed in claim 4, in which the walls of said channel are corrugated.

References Cited in the file of this patent

UNITED STATES PATENTS

| Number | Name | Date |
|---|---|---|
| 501,591 | Richards | July 18, 1893 |
| 768,929 | Breese | Aug. 30, 1904 |
| 830,232 | Jordan | Sept. 4, 1906 |
| 878,455 | Carter | Feb. 4, 1908 |
| 968,417 | Reeder | Aug. 23, 1910 |
| 1,271,557 | Forsyth | July 9, 1918 |
| 1,878,320 | Potter | Sept. 20, 1920 |
| 2,064,899 | Finer et al. | Dec. 22, 1936 |

FOREIGN PATENTS

| Number | Country | Date |
|---|---|---|
| 16,733 | Great Britain | July 29, 1904 |
| 640,075 | France | Mar. 19, 1928 |
| 628,537 | Great Britain | Aug. 31, 1949 |